Sept. 22, 1970   V. L. VAILLANCOURT   3,529,633

X-RAY OPAQUE TUBING HAVING A TRANSPARENT STRIPE

Filed Oct. 23, 1967

INVENTOR
Vincent L. Vaillancourt
BY
Brown & Seward
ATTORNEYS

United States Patent Office 3,529,633
Patented Sept. 22, 1970

3,529,633
X-RAY OPAQUE TUBING HAVING A TRANSPARENT STRIPE
Vincent L. Vaillancourt, Livingston, N.J., assignor to C. R. Bard, Inc., Murray Hill, N.J., a corporation of New York
Filed Oct. 23, 1967, Ser. No. 677,242
Int. Cl. F16l *11/04, 11/06*
U.S. Cl. 138—118                                 7 Claims

ABSTRACT OF THE DISCLOSURE

X-ray opaque catheter tubing for intravenous use or analogous uses composed of polytetrafluoroethylene or polyfluorinated ethylene-propylene ("Teflon," "TFE" or "FEP") with a suitable filler and having a transparent non-radiopaque window or stripe disposed longitudinally of the tube and occupying a minor portion of its circumference.

FIELD OF INVENTION

It is a common practice to form extruded or woven tubing (catheters) for medical and surgical purposes from materials which are opaque to X-rays so that the position of the tube in the human body can readily be determined. It has also been proposed to inject spots of X-ray opaque material at intervals along the length of a tube as it is being extruded (Wallerich Pat. No. 2,212,334, Aug. 20, 1940), or to form an X-ray opaque narrow longitudinal stripe along the surface of a plastic tube by the use of a biorifice tubular extrusion die (Sheridan Pat. No. 2,857,915, Oct. 28, 1958). Certain objections to the Wallerich type of tubing are well explained by Sheridan. As for the latter, the narrow radiopaque stripe is frequently difficult or impossible to observe either by fluoroscope or on X-ray film, this being particularly true of tubing in the intravenous sizes having a diameter of less than 2 mm., as well as larger tubing in deep tissue. In addition, the location of the tubing cannot be exactly ascertained, thus defeating one of the basic reasons for using a radiopaque stripe.

SUMMARY

The present invention overcomes the difficulties encountered in previously known tubing by providing a tube of "Teflon," "TFE" or "FEP," a major portion of which (e.g., 180° or greater included angle, circumferentially) is filled with an adequate quantity of precipitated barium sulfate (blanc fixe) or other X-ray opaque heavy metal while a minor portion remains clear and transparent, forming a "window" through which blood or other fluids can be observed and the patency of the lumen ascertained. The filler has an important effect in stiffening and strengthening the "Teflon" so that the tube wall can be made much thinner than usual for a given I.D. or O.D. "Teflon" has cold flow and the thinness of the wall makes it possible to stretch an end of the tube over the hub or end of a needle, which could not readily be done with a thicker tube, since the resistance to stretching is proportional to the square of the thickness.

SPECIFICATION

The invention is illustrated in the accompanying drawings, in which.

Figure 1:
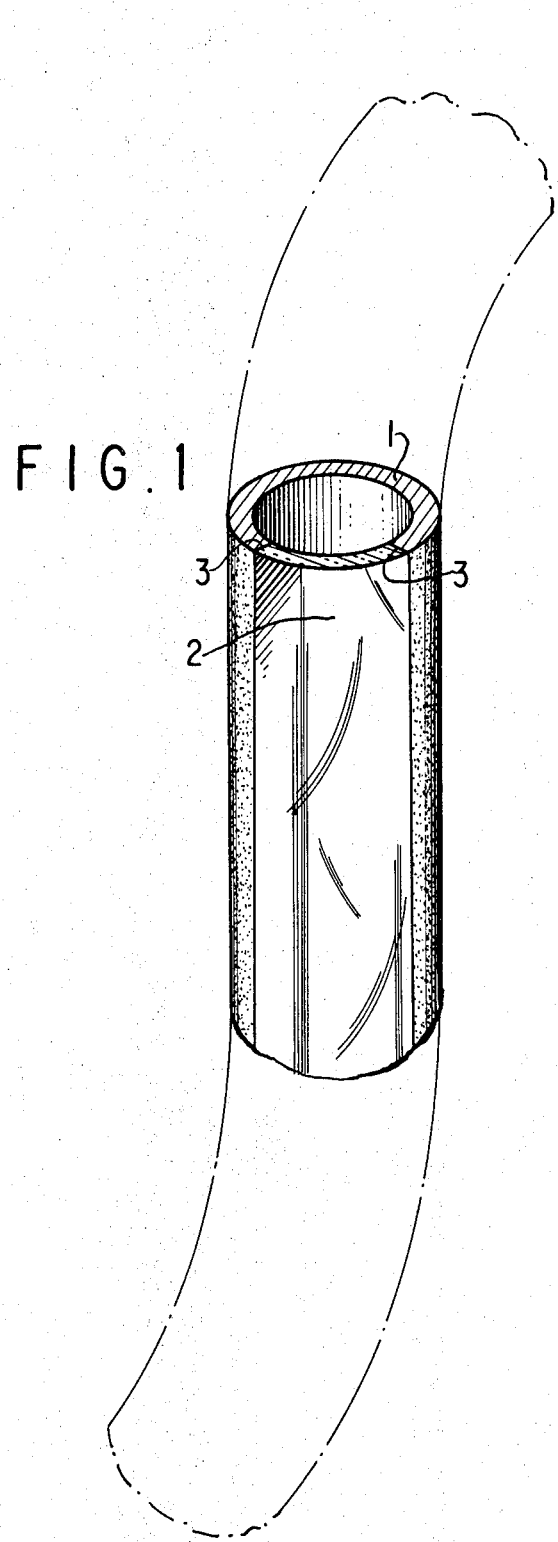
FIG. 1 represents a perspective view, on an enlarged scale, of a piece of tubing, cut to show the relative proportions of the opaque portion and the clear portion.

The portion 1, which is "Teflon" filled with a quantity of blanc fixe which may suitably be 5% to 45% by weight of the filled mixture, is shown in FIG. 1 as constituting about 65% of the tube, measured circumferentially, and a percentage from this figure up to about 75% is considered to be most practical. The clear portion 2 of the tube constitutes the remainder, the portions 1 and 2 being defined by radial planes 3. "Teflon," "TFE" or "FEP" in thin sheets is transparent (Merck Index, 7th ed., page 834) so that flow through the tube can readily be observed. Within the recommended percentages the X-ray opaque portion will be found to subtend an angle corresponding to the entire diameter of the tube, or very nearly so, from any point of view, so that the tubing will have maximum visibility regardless of its position.

Figure 2:
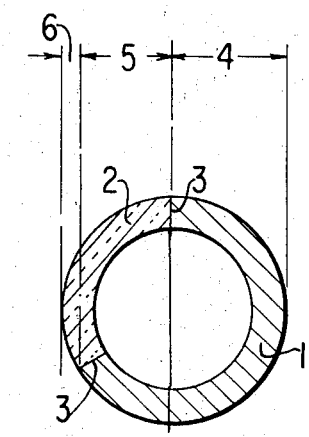
FIGS. 2, 3 and 4 represent sections of tubing turned to different positions in order to illustrate typical shadow effects.
Figure 3:
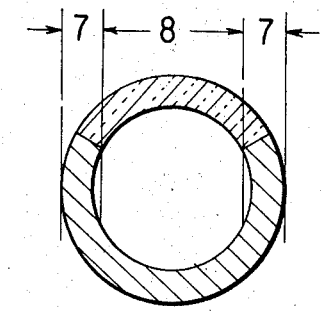
Figure 4:
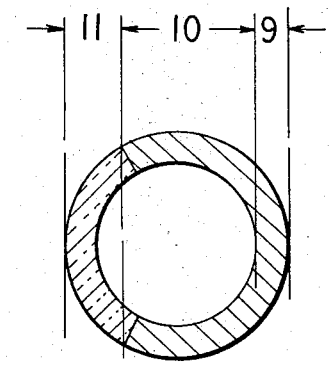

The tubing not only has high visibility, when observed by fluoroscope or recorded on X-ray film, but its characteristics even permit determining quite accurately its orientation around its axis, as illustrated in FIGS. 2, 3 and 4.

Assuming, in each case, that observation is downward from a point directly above each figure, a tube in the position of FIG. 2 will present a dark shadow in the zone 4 where the thickness of the opaque material is equal to at least twice the tube wall thickness at all points, while the zone 5 presents a lighter shadow, corresponding to the single wall thickness at the lower left of the figure, and the very narrow zone 6 presents no shadow at all.

A tube in the position of FIG. 3 will present dark shadows in the zones 7, 7, where the aspect of the opaque material averages about three times the thickness of the wall, separated by a zone 8 in which the opaque material averages only slightly more than a single wall thickness.

A tube in the position of FIG. 4 presents dark shadows (which may be indistinguishable) in the zones 9 and 10 throughout which the opaque material averages at least twice the wall thickness, while the zone 11 casts no shadow but may reveal the passage of opaque liquids or solids through the tube. The combined width of zones 9 and 10 is perceptibly less than the outside diameter of the tubing, which facilitates recognition of this particular orientation.

Since adequate rigidity is obtained with a tube wall substantially thinner than usual, a substantial saving in material cost results. Thus, if the filled opaque portion were reduced to a narrow stripe (as in Sheridan) a much thicker wall would be required for a given required stiffness and there would be a much smaller lumen for a given outside diameter. Particularly with catheters of the type shown in Gautier et al. Pat. No. 3,094,122, the insertion of the tubing into the vein can be more readily accomplished without tearing the vein. For the catheters of the type shown in Doherty et al. Pat. No. 3,017,884, the increased rigidity allows the user (doctor) to take maximum advantage of the inherent slipperiness and thickness of the "Teflon" ("TFE" or "FEP") whose value (slipperiness) is not significantly affected by the incorporation of X-ray opaque fillers within the percentage range given.

"Teflon" is well known to be non-flammable, tough, very inert chemically and adapted for extrusion. The tubing described above can be formed in a known manner by extrusion of the filled and clear material simultaneously through a two-aperture die, or making the "Teflon TFE" perform in two parts (one having the blanc fixe). Blanc fixe is a high quality precipitated barium sulfate having excellent X-ray opacity and being non-toxic as well as compatible with "Teflon," while this latter material is both physiologically and mechanically suitable for use as proposed, because of the characteristics outlined above. It will be understood, however, that other materials having similarly satisfactory characteristics could be used if desired, for the plastic body (e.g., polyvinyl chloride, nylon, polyethylene) and/or for the filler (e.g., heavy metal including bismuth, tungsten, tin, lead.)

What I claim is:

1. X-ray opaque tubing composed of a chemically inert physiologically acceptable long chain polymer plastic, a major portion of which, measured circumferentially through at least a 180° included angle, contains a powdered filler material reflective of X-rays, compatible with the plastic and also physiologically acceptable, and a minor portion of the tube being constituted by the plastic without filler and in a translucent or transparent condition.

2. X-ray tubing according to claim 1 in which the plastic is polytetrafluoroethylene.

3. X-ray tubing according to claim 1 in which the filler is blanc fixe.

4. X-ray tubing according to claim 2 in which the filler is blanc fixe.

5. X-ray tubing according to claim 1 in which the X-ray opaque major portion constitutes approximately 65% to 75% of the tube.

6. X-ray tubing according to claim 1 in which the planes of distinction between the X-ray opaque portion and the unfilled portion lie substantially radially of the tube.

7. X-ray tubing according to claim 1 in which the plastic is selected from the group consisting of polytetrafluoroethylene, polyfluorinated ethylene-propylene, polyvinyl chloride, nylon, polypropylene and polyethylene, and the filler is selected from the group consisting of blanc fixe, bismuth, tungsten, tin and lead.

References Cited

UNITED STATES PATENTS

| 2,227,682 | 1/1941 | Wade | 264—245 X |
| 2,233,987 | 3/1941 | Orsini | 264—245 X |
| 3,097,058 | 7/1963 | Branscum et al. | 264—245 X |

HOUSTON S. BELL, Jr., Primary Examiner

U.S. Cl. X.R.

138—177, 178